United States Patent [19]
Zulian et al.

[11] Patent Number: 5,640,191
[45] Date of Patent: Jun. 17, 1997

[54] RESOLUTION TRANSFORMING RASTER BASED IMAGING SYSTEM AND RELATED TRANSFORMATION METHOD

[75] Inventors: Ferruccio Zulian; Aimone Zulian, both of Cornaredo, Italy

[73] Assignee: Bull HN Information Systems Italia S.p.A., Italy

[21] Appl. No.: 409,171

[22] Filed: Mar. 23, 1995

[30] Foreign Application Priority Data

Mar. 31, 1994 [EP] European Pat. Off. ............ 94830159

[51] Int. Cl.⁶ .................. B41J 2/47; H04N 1/31
[52] U.S. Cl. .................. 347/247; 347/131; 347/251
[58] Field of Search .................. 347/247, 251, 347/254, 252, 240, 237, 131; 358/296, 298, 300, 302

[56] References Cited

U.S. PATENT DOCUMENTS 4,762,998  8/1988  Lubinsky et al. .................. 250/327.2
5,134,495  7/1992  Frazier et al. .
5,327,260  7/1994  Shimomae et al. .
5,450,208  9/1995  Murata .................. 358/296

FOREIGN PATENT DOCUMENTS

0541882   5/1993   European Pat. Off. .
0569657  11/1993   European Pat. Off. .
4239966   6/1993   Germany .
92/09045  5/1992   WIPO .

*Primary Examiner*—Mark J. Reinhart
*Attorney, Agent, or Firm*—Edward D. Manzo; Mark J. Murphy; Ted K. Ringsred

[57] ABSTRACT

Resolution transforming raster based imaging system where an image is formed by displaying dots arranged along scan lines, scanned by an energization beam, the scan lines having a predetermined resolution and the system is driven by an image bit map having rows with resolution multiple of said predetermined resolution, a subset of the rows being related to the scan lines, bits in rows unrelated to scan lines, and representative of dots to the displayed being displayed as dots offset to a next adjacent scan line and with a size related to the surrounding bit pattern.

10 Claims, 8 Drawing Sheets

RESOLUTION TRANSFORMING RASTER BASED IMAGING SYSTEM AND RELATED TRANSFORMATION METHOD

BACKGROUND OF THE INVENTION

The present invention relates to techniques for enhancing the output of a display apparatus in general and more specifically for improving the imaging quality of electro-photographic printers, by rendering them capable of displaying images described by a digital bit map having a resolution multiple of the nominal resolution of the display apparatus.

DESCRIPTION OF THE PRIOR ART

Typically in electrophotographic printers, laser printers for example, a desired image is created by a light beam which scans the charged surface of a photoconductive material in a succession of scan lines or raster.

Each scan line is divided into picture elements or pixel and the light beam is modulated such that selected pixel are exposed to light, the others not.

Then the charge pattern formed on the photosensitive surface is developed (toner is selectively attracted by the photosensitive surface) and the developed image is transferred to paper or to other support.

The image so created is a discrete image consisting of a plurality of pixels arranged in a raster.

The image raster results from the coordinate deflection of the light beam in the direction of the scan lines and the movement of the photosensitive surface perpendicular to the light beam scanning direction.

In a conventional CRT monitor, the image raster is likewise formed by horizontally deflecting an electron beam along horizontally arranged scan lines, at the same time deflecting the electron beam in the vertical direction.

The degree of quantization of the image raster is commonly indicated as resolution and is expressed in dots per length unit.

A printer having a resolution of 300 DPI (dot per inch) produces a raster of dots having a nominal size of 1/300 of an inch.

In practice the printed dots have a slightly larger size, usually 20% to 30% larger.

It is clear that a resolution increase results in better quality image more closely resembling to optical images, which may be considered analog and continuous in nature.

Increasing the resolution of the rastered image, has however several trade-offs.

Since the image to be displayed is originated from a digital description thereof and each pixel may be described with the logic level of one bit, the memory size required to store the description increases as well as the processing speed of the circuits and devices which convert such description in a printed image.

It is to be noted that in laser printers gray tones of a continuous tone image are obtained by clustering dots so as to locally obtain a black-white ration which is perceived by the human eye as a gray.

Thus each pixel is still described by a single bit.

The process of gray tone generation is named "dithering" and results in resolution loss because if a pixel cluster is constrained to describe a predetermined gray tone, the cluster pixel cannot describe at the same time the sharpness of an edge.

With the advent of faster and faster electronic circuits and more and more unexpensive memories of larger capacity several limitations to the adoption of higher resolution have been removed, but others remain.

Particularly in laser printers the deflection of the light beam is caused by a precisely machined rotating polygonal mirror, whose rotational speed cannot be increased at will and without incurring in cost increases.

Thus if resolution in the direction of the scan lines can be easily increased via electronic timing and there is no problem in locating any number of dots in any position along the scan line, a resolution increase in the direction transverse to the scan line direction can only be achieved by proportionally reducing the throughput of the equipment, i.e. reducing the speed of the photosensitive surface and correspondingly of the transfer medium (paper).

In LED array printers the vertical resolution depends on the paper advancement speed and on the frequency at which the LED array is controlled.

Increasing the frequency without reducing paper speed, thus achieving a higher vertical resolution is possible, but the horizontal resolution depends only on the horizontal array density, with imposed strong constraints.

Today laser printers are available with a throughput of 16:20 page per minute (A4 size).

They print with a resolution of 300 dpi.

If it is desired to print with a resolution of 600 dpi, as some equipment does, the throughput is lowered to 8:10 pages per minute.

For this reason several attempts have been made in the last years to improve the quality of images generated by display apparatuses without increasing their resolution.

These attempts have been essentially centered about the problem of smoothing edges and line "jaggies" with a real time analysis of a sample window representing in binary form the black-white level of a pixel currently in process of being printed (or displayed) and of neighbouring pixel so as to subject the pixel to the printed to some modifications, such as printing as a shifted dot along the scan line;

printing as a smaller than normal dot;

printing as a larger than normal dot;

printing as an added, smaller than normal dot;

printing as a stream of smaller than normal dots along the scan line.

The sample window analysis may be conducted either by comparison with templates or by logical operations.

Examples of such techniques are provided by U.S. Pat. No. 4,847,641, U.S. Pat. No. 5,029,108, EP-A-0541882, EP-A-0569657.

In particular U.S. Pat. No. 4,847,641 discloses a method and apparatus by which a sample window is analyzed by comparison with templates and as a result of such comparison a pixel is printed as a smaller than normal dot, in case as an added dot, with or without shift in the direction of the scan line.

The disclosure provided by U.S. Pat. No. 5,029,108 is similar to the previous one, except that the sample window is analyzed by convolving the sample window pattern with gradient masks.

EP-A-0541882 discloses a method and apparatus where as a result of a sample window analysis a pixel is printed as a dot which may be smaller than normal or greater than normal.

The printing of greater than normal dots, in combination with normal or smaller than normal dots significantly increases the quality of the displayed images and virtually eliminates the staircase appearance of slanted edges and lines.

EP-A-0569657 discloses an apparatus using the concept above, where the sample window, in this case a scan windows, is analyzed with a sequential scanning process performed by a plurality of units, each over a predetermined portion of the scan window to detect anomalies and to correct them by using an interpolation method.

In all examples above, the display or printing apparatus is capable of displaying or printing with a predetermined nominal resolution, for instance 300 DPI and is driven by a bit map image having the same resolution.

Recently another technological trend is emerging which proposes to use a different resolution of the bit map in the direction corresponding to the scan direction, and in the direction transverse thereto.

Thus an image can be described and displayed with a raster having a resolution of 600 DPI in the scan line direction and a resolution of 300 DPI in the perpendicular direction thereto.

The scan line direction is normally the horizontal direction in laser printers or CRT displays and the vertical direction in LED printers.

Compared to printing displaying equipment using a 300 DPI resolution, this only involve a doubling of the memory size required to store the binary description of an image and faster control circuits, but does not imply any decrease of the equipment throughput.

In line with this trend, U.S. Pat. No. 5,134,495 discloses a method and apparatus by which a virtual resolution of 600×600 DPI can be achieved in equipment having a nominal resolution of 300 lines per inch, by using a bit map image having a resolution of 600 DPI in both directions.

Only half of the bit map rows can be related to scan lines of the printing/displaying equipment, the other half, consisting of rows interleaved to the previous ones or "odd" rows, cannot be related.

However, dots placed in a line interleaved between scan lines can be obtained as the result of interference between two or more dots visible or latent located in adjacent scan lines, thus providing a visualization of the bit map rows unrelated to scan lines or odd rows.

The concept of interference among dots as well as the concept of "latent dot" is clearly explained in the cited patent.

A "latent dot" is a pixel which has been exposed to the scanning light bean or electron beam, but has received exposing energy below a threshold which must be surpassed to result in imaging of the dot.

Since the intensity spatial distribution of the light beam (obtained from a laser or a LED) or electron beam is substantially a gaussian distribution two adjacent exposed pixel always interfere at some extent and visible, imaged dot may result as the exposure sum of adjacent latent dots.

Although theoretically feasible this approach requires a spatial intensity distribution of the energization beam with a large spread (high σ of the gaussian distribution), greater than the scan line pitch.

As a consequence the resulting process is unreliable, difficult to control and causes undesired and uncontrolled interference among adjacent pixels forming undesired dots and altering the image tone.

Moreover it is inconsistent with resolution or more properly graphic/edge enhancement methods based on dot size modulation as those previously commented, in particular the one disclosed in EP-A-0541882, which requires a broad modulation range achievable only with low σ (equal to the scan line pitch and preferably a fraction thereof).

SUMMARY OF THE INVENTION

These limitations are overcome by the resolution transforming raster based imaging system and related resolution transforming method of the present invention, where an imaging equipment, in particular a lase printer or LED printer, designed for displaying an image with a predetermined resolution, is driven by an image bit map having a resolution multiple than the predetermined of the equipment and is virtually capable of displaying the image, with the higher resolution at the same operative speed, with no throughput reduction.

As a further aspect of the present invention an imaging system is provided which can operate as resolution transformer driven by an image bit map having higher resolution than the one of the displaying equipment, as dot modulation graphic/edge enhancer driven by an image bit map having the same resolution of the displaying equipment and jointly as dot modulation graphic/edge enhancer and resolution transformed driven by an image bit map having higher resolution than the nominal one of the displaying equipment.

As a further aspect of the present invention an imaging system is provided which can operate as resolution transformer driven by an image bit map having lower resolution than the one of the displaying equipment, which map is first converted in an image bit map having resolution multiple of the one of the displaying equipment and then displayed, virtually with such higher resolution, further possibly with graphic/edge enhancement by dot modulation.

According to the invention these results are achieved by an imaging system and method, where the image bit map of higher resolution is analyzed to detect dots in odd rows unrelated to raster lines of the displaying equipment.

These dots are then printed in the raster line of the display equipment related to the closest adjacent row, with a negligible shift which is not perceived by the human eye.

Depending on the dot pattern adjacent to the detected dots, they are modulated in size and displayed as dots corresponding in size to the resolution of the image bit map, as dots having size somehow greater than the size corresponding to the resolution of the image bit map, as dots corresponding in size to the nominal resolution of the displaying equipment or as bigger dots corresponding to a resolution lower than the nominal one of the displaying equipment.

As a result of this process the resolution of the bit map and the local gray tone (e.g. the ration of the black area as to the white) is retained in the displayed image, with no fidelity loss and minimal distortion or no distortion at all, except in few cases which are only of theorical interest and usually do not in practice occur.

It is to be noted that the image description by higher resolution bit maps is essentially dictated by the need to remove two essential defects: the grainy appearance of gray tone images obtained by dithering processes of scanned images with consequent resolution loss and the "jaggies" of fonts and graphic lines edges.

But lines, in order to be clearly perceived by the human eye must have a thickness in the order of 100μ or more, and the same is for fonts.

Consequently they have to be formed by a plurality of adjacent dot lines (if the dots must have a size of 40μ a minimum of 3 lines).

As to dithered images isolated dots or dots cluster are intended for defining the gray tone of an image portion by defining a predetermined ration between black and white areas of the image portion.

A dot misplacement in the order of 40μ is unperceivable to the human eye.

Thus the dot shift resulting from the process of the invention does not cause any perceivable image degradation as long as the black-white ration is preserved.

BRIEF DESCRIPTION OF THE DRAWINGS

The features and the advantages of the invention will appear more clearly from the following description of a preferred form of embodiment and from the enclosed drawings where:

FIG. 18 shows a bit map portion used by the resolution transforming system and method of the present invention.

FIGS. 19-1 to 19-14 show bit patterns detected in the bit map of FIG. 18 for providing resolution transforming.

DESCRIPTION OF THE PREFERRED EMBODIMENT

Figure 1:
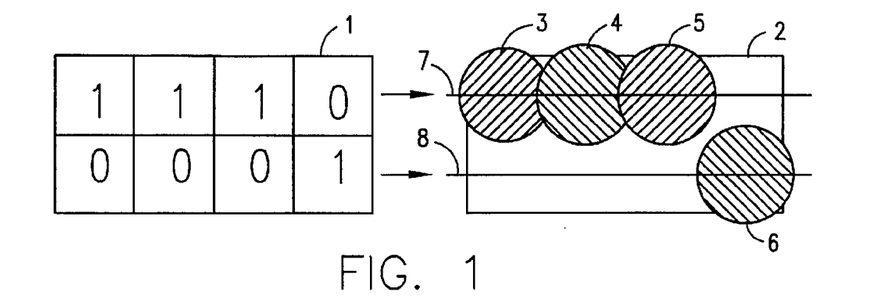
FIG. 1 shows an image bit map portion having a first resolution and the displayed image portion resulting from displaying with a displaying unit having the same resolution.

Referring to FIG. 1, exemplary of the prior art, there is shown a portion 1 of an image as described by a bit map where black elements are representative by "ones" and white elements by O.

Off course the relation between bit value and black-white pixel level can be reversed.

For example the resolution of the bit map may be 300× 300 DPI. This means that each pixel, represented by each bit has a nominal size of ⅓₀₀", say about 85 μm, and must be represented by a dot of like size.

A laser printer intended for printing with the same resolution will produce a corresponding image 2 formed by nearly round dots 3, 4, 5, 6, each having a diameter slightly greater than 80 μm so as to obtain a partial overlapping of the dots.

In FIG. 1 each row of the bit map corresponds and is related to a scan line 7, 8 of the printing equipment and the pitch between scan lines is obviously ⅓₀₀".

Figure 2:
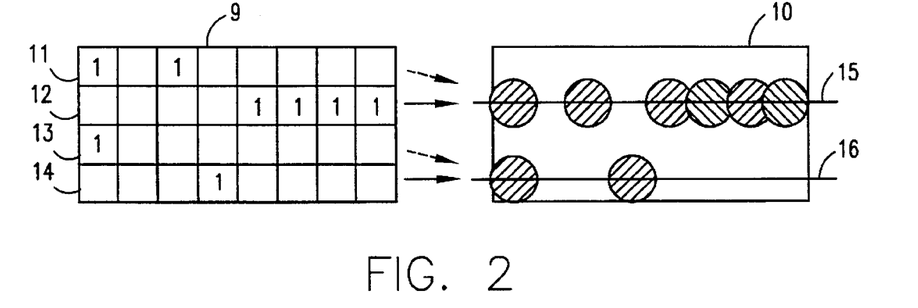
FIG. 2 shows an image bit map portion having a second resolution, 2×2 times the one of FIG. 1 and the corresponding displayed image resulting from the resolution transforming system and method of the present invention.

Referring to FIG. 2 there is shown a portion of an image, described by a bit map with resolution of 600×600 DPI.

In this case each pixel described by one bit has a size of about 40 μm.

If the bit map 9 is used to drive a laser printer whose nominal printing resolution is 300 DPI it is impossible to relate all the rows 11, 12, 13, 14 of the bit map to scan lines 15, 16 of the printer, but only a subset of them.

For instance in FIG. 2 row 12 and row 14 are respectively related to scan lines 15, 16.

The "one" bits of rows 12, 14 can be easily displayed as dots of small size in the image formed by the printer and retain their spatial distance and relation as well as the image black-white ration.

The "one" bits in rows 11, 13 or "odd" rows cannot be displayed in scan lines intermediate to lines 15, 16 because intermediate scan lines do not exist.

According to the present invention, they are printed as dots in scan lines 15, 16 respectively with a spatial position along the line and a size reflecting the spatial position and pixel area of the image bit map.

The error made by this approach is just a vertical offset of about 40 μm undetectable by visual inspection.

Moreover, isolated dots and single line dots, in a bit map having 600 DPI resolution are unlikely to occur except as component of a dot cluster resulting from a dithering process or from image scanning, where the spatial position of the dots is nearly unrelevant.

It is to be noted that the process for transforming the resolution of a 600 DPI bit map in a printout having the lower resolution of 600×300 DPI is not a brute logical OR of two adjacent bit map rows, bit is a function of the bit pattern as it will be more readily apparent from the following.

Figure 3:
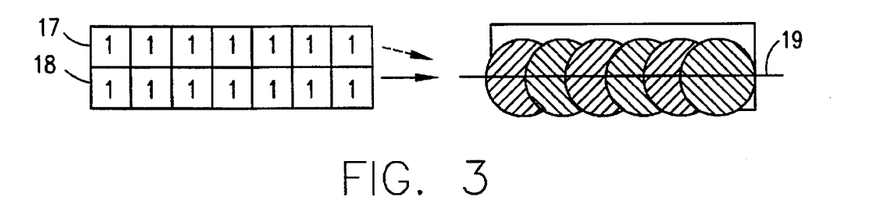
FIG. 3 shows a bit map representing an horizontal line having a width of two bit rows and the corresponding displayed image resulting from the resolution transforming system and method of the present invention.

FIG. 3 shown a bit map representing with resolution of 600 DPI an horizontal line having a thickness of two bit map rows 17, 18 say about 85 μm.

Again one of the rows 18 can be related to a scan line 19 of a laser printer, having nominal resolution of 300 DPI but the presence of "one" bits in the adjacent odd row 17 being detected, in line 19 dots are printed having a size corresponding to the nominal resolution of the printer and overlapped in the direction of the scan line, to form a continuous line.

The resulting printed line has a size exactly corresponding to its description in the bit map and is vertically offset as to the theoretical position which should have of about 20 μm only.

This offset is unperceivable to the human eye even in case of parallel lines, which in order to be discriminated, should be spaced apart a distance in the order of more than 0,2 mm.

Anyhow thin lines of this size are scarcely used and clearly legible drawings and type fonts require a larger size.

Figure 4:
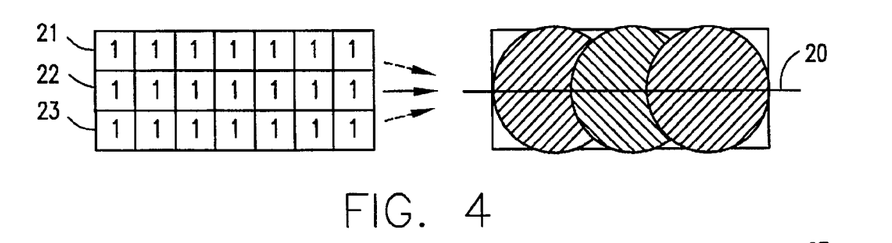
FIGS. 4 and 5 show bit maps representing an horizontal line having width corresponding to three bit rows and the corresponding displayed images resulting from the resolution transforming system and method of the present invention.
Figure 5:
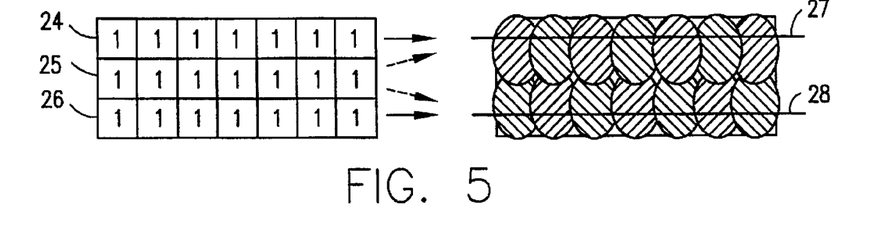

Thus the only practical situation which may occur in graphs and font displaying involves the presence of three adjacent rows at least of "one" bits and is depicted in FIGS. 4 e 5.

FIG. 4 shows an image bit map representing with resolution of 600 DPI an horizontal line having a thickness of three bit map rows 21, 22, 23.

Again one of the bit map rows 22 can be related to a scan line 20 of the printer and the presence of "one" bits in adjacent odd rows 21, 23 is detected, thus printing, by proper modulation of the energization beam of the printer the set of the three bit rows as a dot sequence of enlarged dots having a size greater than nominal and corresponding to 1,5 times the scan line pitch.

Printing of enlarged dots results in a solid line with overlapping of adjacent dots even if the number of dots printed in the scan line direction is less than the number of "ones" in the bit map rows.

Printed dot overlapping provides anyway solid appearance of the imaged line.

It can be seen that in this case the bit map pattern is displayed without any spatial placement error.

The same result is obtained as shown in FIG. 5, if bit map rows 24, 26 adjacent to inner row 25, are related to scan lines 27, 28 of the printer.

In this case a line is printed as a sequence of dots placed along the scan lines 27, 28.

The dot size may be set to be slightly greater than or equal to the nominal size of a pixel in the 600 DPI representation, and nearly half the size of a pixel in the 300 DPI matrix.

The interference among dots in adjacent scan lines, which occurs even for σ in the order of half the scan line pitch causes the printing of oval dots extended between the scan lines, and approaching each other or even overlapping, so as to result in a solid line having a thickness corresponding to three bit map rows (nearly 120 μm) and spatially located with no offset as to the desired position.

It is clear that the modulation approaches for resolution conversion, described with reference to FIGS. 3, 4 and 5 may be combined together, in order to provide the printing of slanted or nearly horizontal lines.

Figure 6:
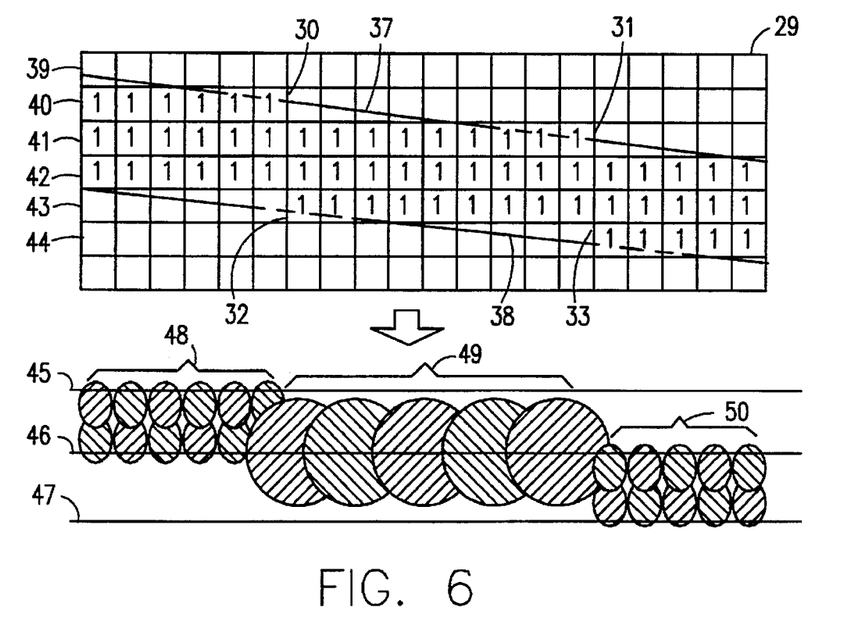
FIG. 6 shows a bit map representing a nearly horizontal line having width corresponding to three bit rows and the corresponding displayed image resulting from the resolution transforming system and method of the present invention.

For example FIG. 6 shows a bit map portion 29 representing a nearly horizontal line, having a thickness corresponding to three pixels with resolution of 600 DPI.

Since the bit map is binary, the line is described as a stair having steps 31, 32, 33, 34.

The map may be considered the best possible binary description (with resolution of 600 DPI) of a straight line defined by edges 37, 38.

In converting the binary description into a printed image, with a printer having scan line pitch of 300 DPI rows 40, 42, 44 of the bit map may be related to subsequent scan lines 45, 46, 47 and the line can be printed, as a sequence of small dots 48 extending first along scan lines 45, 46, then as a sequence of enlarged dots 49 extending along scan line 46 and further as a sequence of small dots 50 extending along scan lines 46, 47.

The displayed image may be considered a faithfully reproduction of the bit map image but, compared with the straight line which the bit map purports to describe, is affected by "jaggies" the same extent of the bit map.

According to a further aspect of the invention, the printed image can be further enhanced by combining the modulation which adapts the map resolution to the printer resolution with the graphic enhancement method as the one disclosed in EP-A-0541882, which modulate the dot size depending on the surrounding dot pattern.

If the σ of the spatial distribution intensity of the energization beam is relatively low, in the order of one half the scan line pitch or even less a precise modulation of the printed dot size can be performed, over a broad range spanning from nearly ⅕ of the scan line pitch, to about two times the scan line pitch.

Figure 7:
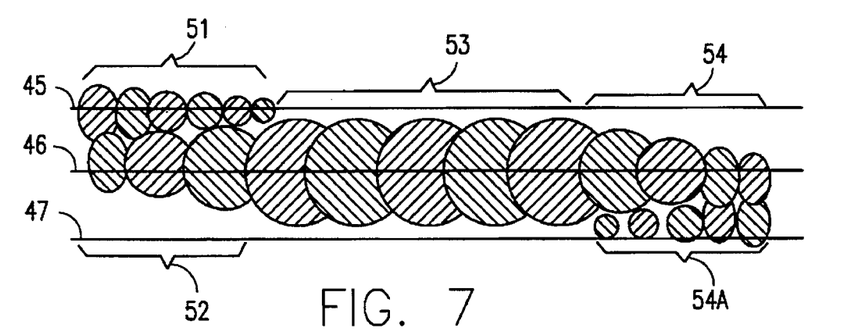
FIG. 7 shows the displayed image of the bit map of FIG. 6 resulting from the resolution transforming system and method of the present invention further performing graphic enhancement.

Thus by analysis of the bit map pattern (through template comparison or logical processes) dot printing may be controlled so that the printed output results as shown in FIG. 7, formed by dots 51 in scan line 45 decreasing in size, by dots 52 in scan line 46 increasing in size, then by dots 53 in scan line 46 constant in size, by dots 54 in scan line 46 decreasing in size and by dots 54A in scan line 47 increasing in size.

The result is a line image where jaggies are substantially removed.

It is noted that dots 53 have all equal size and diameter corresponding to 1, 5 times the scan line pitch, consistent with the thickness of the line described by the bit map.

Should the bit map represent an line of greater thickness or the edge of an image, even better correction of jaggies could be achieved by modulating the size of dots, such as 53 of FIG. 7 in the range from 1, 5 to 2 times the scan line pitch.

Clearly the same approach may be used in converting the 600 DPI binary description of any kind of image, where 3 or more "one" pixels are vertically aligned.

Figure 8:
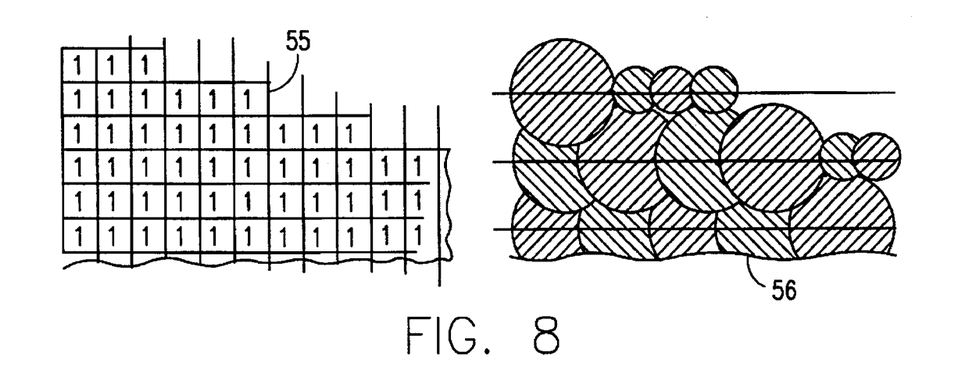
FIG. 8 shows a bit map representing a generic edge of an image and the corresponding displayed image in accordance with the present invention.

FIG. 8 is an example of such an image as described by a bit map 55 and the corresponding printed image 56 obtained with the above described conversion method from a printer having lower resolution.

FIG. 8 does not deserves any explanation.

In all examples above reference has been made to a bit map having a resolution twice the scan line pitch of the printing/displaying equipment.

It is however clear that the conversion method can be used for printing/displaying images departing from a bit map having a resolution multiple (two, three or four time) of the printer scan line pitch.

It has to be further noted that the multiple bit map resolution can be obtained from a lower bit map resolution thus allowing a printer to display images described by a bit map whose resolution is not a sub-multiple of the printer scan line pitch.

For example fax equipments conventionally use an image resolution of 200 or 400 DPI which is not compatible with the resolution of laser printers, which is usually 300 or 600 DPI.

The bit map obtained from fax equipment can be easily converted from a resolution of 200 DPI (400 DPI) to a resolution of 600 DPI (1200 DPI) by conversion of each pixel in a cluster of 3×3 pixels of the higher resolution.

The higher resolution bit map may then be used with the method above described in printing equipment having resolution of 300 DPI or 600 DPI.

Figure 9:
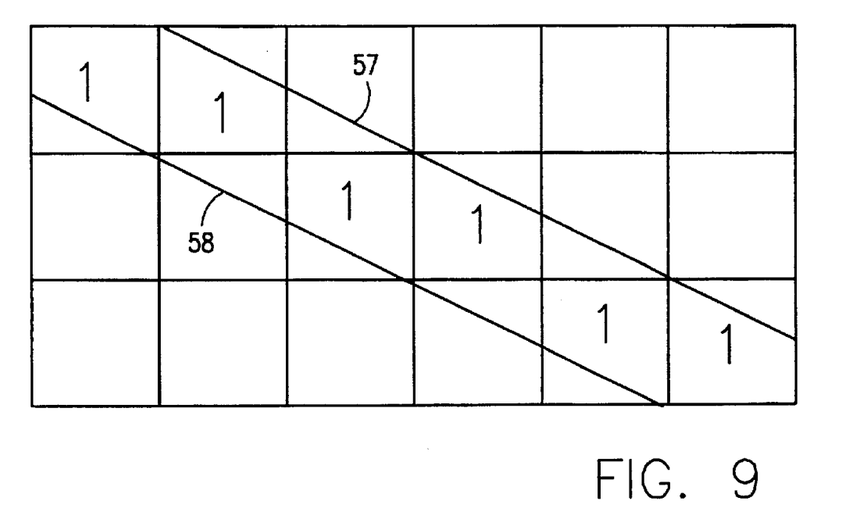
FIGS. 9, 10, 11 respectively show an image bit map of a slanted line, as obtained from a low resolution equipment, such as a facsimile equipment, an higher resolution bit map resulting from transformation by the system of the present invention and the displayed image resulting from the use of the system and method of the present invention.

For instance a slanted line having a thickness in the order of 1/200" (as defined by edges 57,58) may be detected by fax equipment and described by the bit map of FIG. 9.

Figure 10:
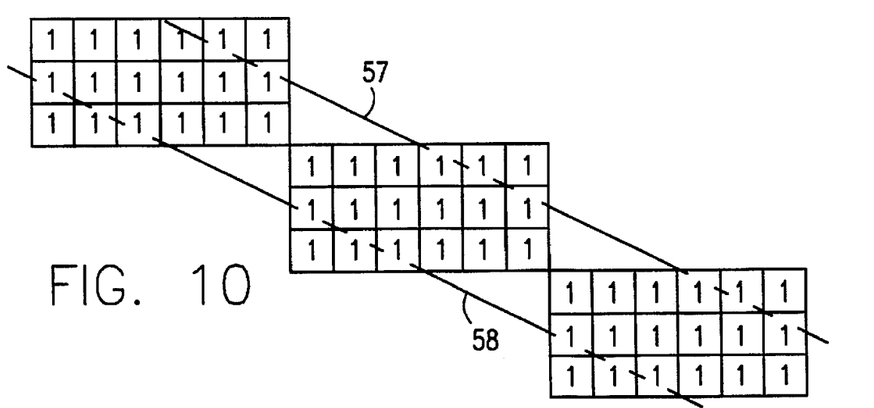

This map can be easily converted in a corresponding map having resolution 1/600" as shown in FIG. 10.

Figure 11:
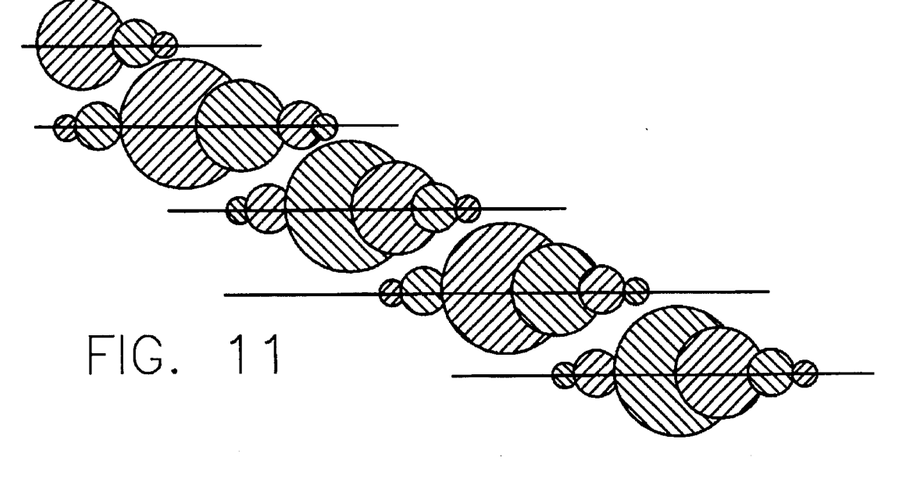

The bit map of FIG. 10 can be used to drive a printer having resolution of 300 DPI and the size of the dots can be modulated to obtain an image which closely resembles to the original image as shown in FIG. 11, where advantage is taken from both the method of resolution converting by printing size modulated dots along scan lines both from the method of edge enhancing by printing size modulated dots depending on the image pattern to smooth jaggies.

As already indicated compatibility of the two approaches is essentially allowed by the use of a printing/displaying equipment with energization beam intensity having low spread with σ in order of less than the scan line pitch.

The reason of this constraint is explained by the following considerations.

Laser printers make use of a laser beam whose power is distributed in space according to the following distribution law $$I(x, y) = \text{------} \quad (1)$$

where x is the scan direction of the laser beam, y the direction transverse thereto and Io the power of the laser beam at the center of the beam.

Note that σx differs from σ7 and is slightly less than σy.

In this equation, for simplification purpose it is assumed that the beam can be instantaneously switched on and off.

The energy impinging on the surface unit of the photosensitive member is therefore given by $$E(x,y) = \int_{ton}^{toff} I(x,y)dt = Dt * I(x,y) \text{ for a steady energization beam} \quad (2)$$

and $$E(x,y) = \frac{toff}{ton} * e \quad (3)$$

Equations (2) and (3) show that the energy distribution along the y axis, is still gaussian and is proportional or roughly proportional in case of equation (3), to the exposure time D t.

The size of a dot formed on a photosensitive surface depends on the impinging energy, and on the threshold energy level of the photosensitive surface; only the portions of the photosensitive surface energized above the threshold level lead to dots formations.

The relevance of σ in these equations is apparent considering FIGS. 12, 13, 14, 15.

Figure 12:
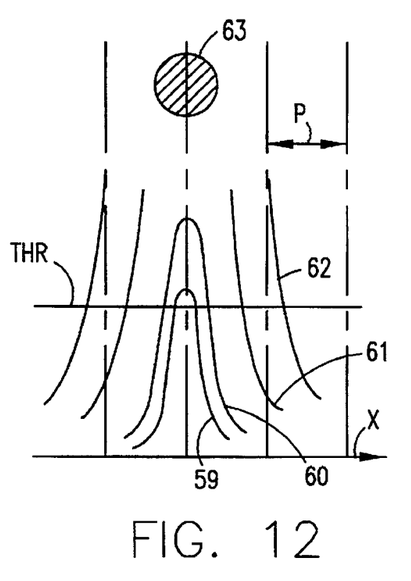
FIG. 12 is a diagram showing the energy spatial distribution of a light/electron beam for differing exposure times, with a beam having a low sigma.

In FIG. 12 several energy diagrams 59, 60, 61, 62 corresponding to differing exposure times, are plotted along the axis for x=o (dot center) with σ p where p is the scan line pitch.

Given a predetermined threshold THR of the photosensitive surface, it appears that the energization level described by diagram 59 leads to the printing of a very small dot, having size in the order of 1/3 p.

By increasing the exposure time, energy diagrams 60, 61, 62 show that the dot size can be increased for instance up to 3 p.

Since the diagrams always crosses the threshold level THR nearly with the same high slope, the dot size modulation is practically unsensitive to changes in THR, and proportional to the exposure time.

Possible errors in dot size modulation are proportional to errors in setting the desired exposure time.

Reference 63 indicates a standard size dot obtained by energization according to diagram 60.

Figure 13:
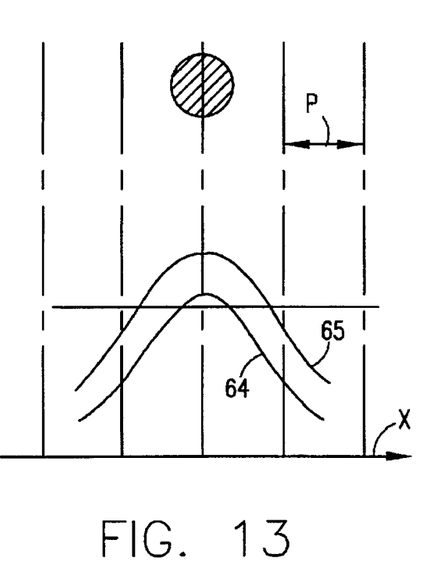
FIG. 13 is a diagram showing the energy spatial distribution of a light/electron beam, for differing exposure times, with a beam having high sigma.

By contrast FIG. 13 shows energization diagrams 64, 65 of a beam having σ=2p as required for obtaining dot formation by interference of two or more latent dots.

The energy spread is such that it becomes very difficult to obtain in controllable way small size dots, and little deviations of THR from its nominal value or little errors in exposure time may result in the printing of dots having a size quite far from the desired one or even in no printing at all (latent dot).

Figure 14:
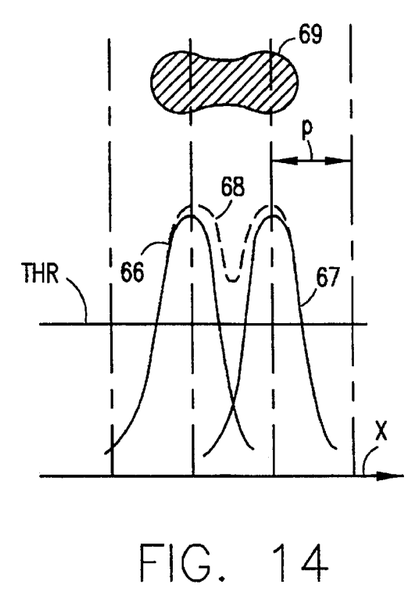
FIG. 14 is a diagram showing the interference effect and displaying result of two adjacent exposures to a beam having low sigma.
Figure 15:
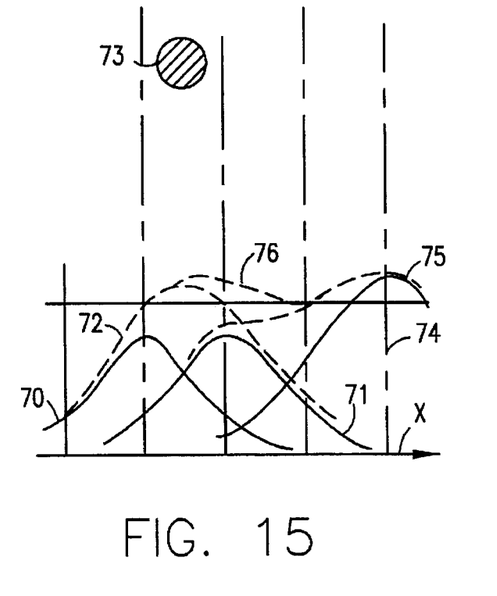
FIG. 15 is a diagram showing the interference effect and the displaying result of two adjacent exposures to a beam having high sigma.

Only the size of dots larger than standard can be more easily controlled, but the required level of energization causes unacceptable interference with adjacent dots as clearly shown by comparison of figures 14 and 15.

In FIG. 14 two adjacent diagrams 66, 67 (where σ=1) are plotted, representing the energization level required to print two adjacent standard size dots in adjacent scan lines.

The cumulative energization level is clearly the sum of the two diagrams and results in diagram 68.

The two printed dots are merged in a single elongated dot 69, whose size can be easily modulated without substantive interference with possible dots spaced apart more than p.

By contrast in FIG. 15 two adjacent diagrams 70, 71 (where σ 2) are plotted, representing an energization level below the threshold level THR, for obtaining two "latents" dots which by interference (diagram 72) allow to obtain a dot 73, in a position intermediate to the scanlines.

As already explained, the dots size is critical.

Moreover, substantive interference with non adjacent dots results.

For instance it becomes impossible to print distinct dots spaced apart by a scan line.

The energization required to print a visible dot in scan line 74 (diagram 75) would interfere for instance with diagram 72 and would result in energization diagram 76 causing the printing of a dot which extends for the length of more than 3 p.

It would be impossible to leave a white pixel between scan lines 72, 75 for the purpose of providing an average gray tone by dithering.

Moreover the size of the printed dot would be practically uncontrollable.

This is not the case in FIG. 14 where the dot size can be easily modulated so as to obtain small isolated dots or dots merging together and having a controlled size even larger than the standard size, with no or little interference with dots spaced apart more than one pitch.

Thus according to the method of the invention the trade off of a neglectable misplacement of isolated dots or very thin dot sequences is largely compensated by the resulting advantages in term of modulation control.

Figure 16:
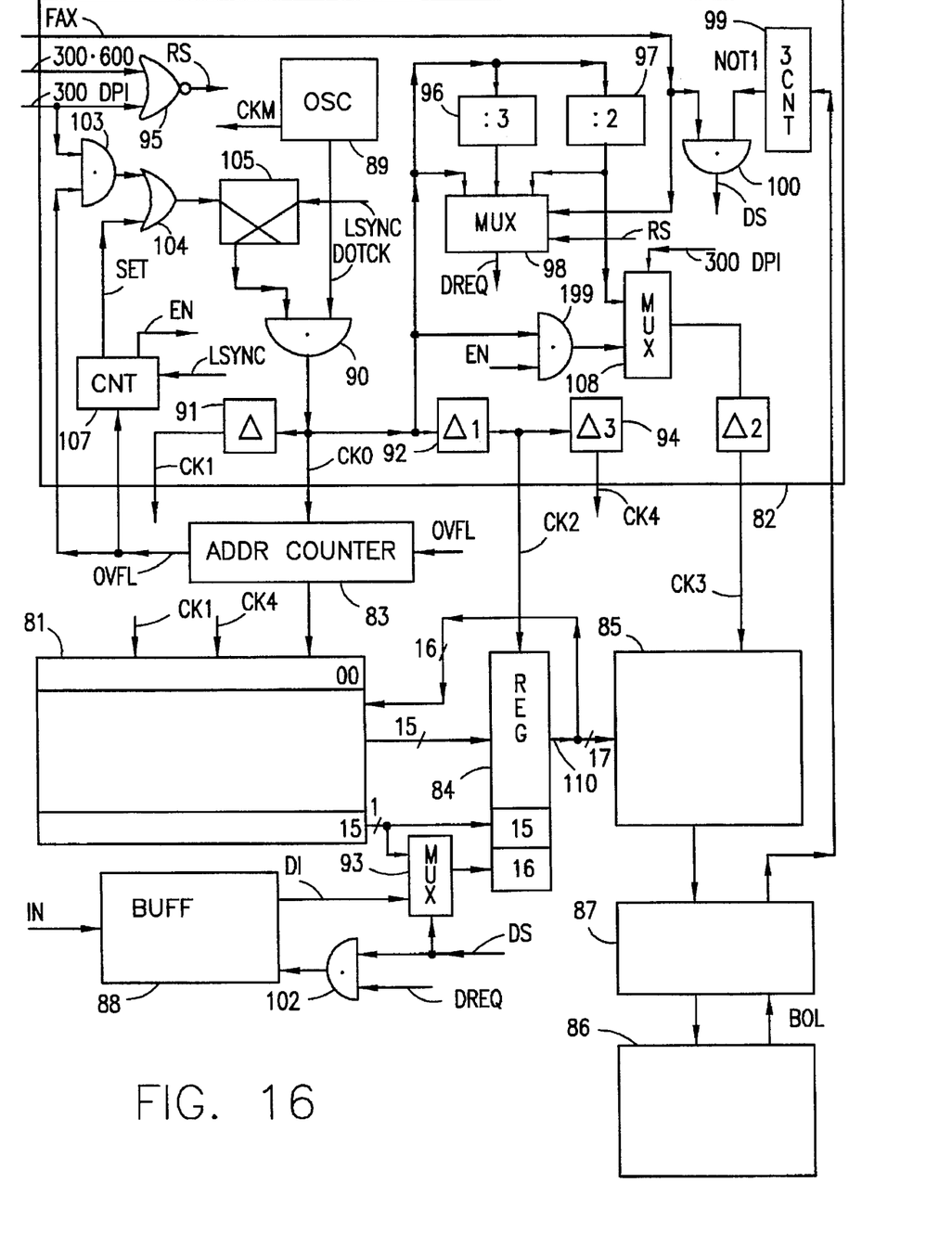
FIG. 16 is a block diagram of a preferred embodiment of resolution transforming raster based imaging system in accordance with the present invention.

FIG. 16 shows in block diagram a preferred form of embodiment of resolution transforming raster imaging system according to the present invention for implementing the described method.

Basically the system comprises a buffer 81 storing a plurality of N subsequent rows (preferably in number of 16) of a bit map image, a timing unit 82, providing suitable timing and control signals CKO,CK1,CK2,CK3, DREQ, DS, a buffer addressing counter 83 an output register 84, a bit pattern detecting and analysing unit 85, a printing/displaying unit 86 (which may be a so called printing engine in case of electrophotographic printer, or a CRT monitor in case of a display unit) and a control unit 87 of the printing/displaying unit 86.

An additional data buffer 88, preferably FIFO buffer, is provided (but not necessary) for decoupling the data input rate at which the system is supplied with external data, from the internal system timing.

The printing unit 86 is driven by the control unit 87 in conventional way, and sends to the control unit 87 a periodic analogic BOL signal, indicating that the scanning beam is in a predetermined scanning position, for instance the beginning of a scan line.

Signal BOL, is converted by controller 87 in a binary signal LSYNC providing line synchronization of the timing unit with the engine 86 requirements.

The LSYNC period is related to the operative speed of the printer and to its resolution.

Typically, for a laser printer having nominal resolution of 300 DPI and throughput of 16 ppm (DIN A4 size pages per minute) the line scan period is in the order of 1 msec.

The scan line period comprises two phases an active phase during which the laser beam impinges on the photosensitive surface, and an idle or latency phase.

Normally the latency phase is equivalent or longer than the active phase.

With this assumption a line is scanned in a time interval of 450–500 μsec and the scan period of a pixel with resolution of 300 DPI is about 200 nsec or 100 nsec (corresponding to a frequency of 10 Mhz) if pixel resolution of 600 DPI is desired.

The timing unit 82 comprises an oscillator 89 providing a reference clock DOTCK with 10 MHz frequency, from which, through a plurality of gates, dividing circuits and multiplexers a plurality of timing signals CK0, CK1, CK2, CK3 is obtained.

In addition to signal LSYNC, the timing unit 82 receives control signal FAX, 300 DPI and 300×600 respectively indicating when asserted, that the bit map received by the system from an external source (for instance a data processing system or an image acquisition system) is a facsimile bit map with resolution 200 DPI, a bit map with resolution of 300 DPI, or a bit map with resolution of 300 * 600 DPI.

When these signals are deasserted the bit map received by the system has resolution of 600×600 DPI.

The clock signal DOTCK is input to an AND control gate 90 normally enabled, which outputs a clock signal CKO having the same frequency of DOTCK.

Clock signal CKO is input to the addressing counter 83 causing it to increment.

The output of counter 83 provides a cyclical address to buffer memory 81, which is enabled for a read operation by a clock signal CK1, obtained from CKO, through a suitable delay element 91.

At each read operation buffer memory 81 outputs N bits (16 in the described embodiment) representing a columns of the stored bit map.

These N bits, are loaded in register 84, clocked by signal CK2 (obtained from CKO through a delay element 92) together with a bit DI of the image bit map received from an external image source, through a multiplexer 93 and buffer 88.

With a subsequent timing signal CK4 (obtained from CK2 through a delay element 94) the bits latched in register 84 are rewritten in buffer 81, at the same location currently addressed, but vertically shifted one bit, so that bit DI is stored in row 15 of buffer 81 and the bit originally in row 00 is lost.

Therefore in well known manner, by subsequent read and write operations, the buffer 81 content is updated so as to describe new bit map rows, subsequent to each other.

Clearly buffer 81 has a size adequate to store full rows of the bit map at the highest resolution contemplated by the embodiment (600 DPI).

The function of multiplexer 93 is now explained in connection with timing unit 82.

Since the image bit map IN input (in parallel or serial way) to buffer 81 has one of many possible resolutions, in particular 200×200 (FAX image) 300×300 DPI, 300×600 DPI or 600×600 DPI, the horizontal resolution of the bit map is converted or normalized to 600 DPI for storing in buffer memory 81.

In case of FAX bit map the vertical resolution too is converted into a resolution of 600 DPI.

Accordingly the timing unit 82 comprises circuits for requesting to buffer 88, single data bits D1 at a rate related to the resolution of the original bit map.

These circuits are NOR gate 95, a divider by 3, 96, a divider by 2, 97 and a multiplexer 98.

NOR gate 95 receives as input signals 300×600 and 300 DPI both indicating that the horizontal resolution of the bit map is 300 DPI, and outputs a signal RS which is input to a control input of multiplexer 98.

Multiplexer 98 further receives, at a control input, signal FAX indicating that the horizontal resolution of the bit map is 200 DPI.

Clock signal CKO is input to dividers 96,97 and to a data input of multiplexer 98 which has two other data inputs connected to the output of dividers 96, 97.

Depending on signals RS, FAX asserted, multiplexer 98 outputs a signal DREQ having the same frequency of CKO, half the frequency of CKO or one third the frequency of CKO.

Signal DREQ controls read out of a single data bit DI from buffer 88 at each period of DREQ, through a control gate 102 whose function will be considered later.

It is therefore clear that if the bit map resolution is 200 DPI a data bit D1 is replicated and stored in buffer memory 81 (through register 84) as a sequence of three equals bits, and if the bit map horizontal resolution in 300 DPI the data bit D1 is again replicated and stored in buffer memory 81 as a sequence of two equal bits.

Conversion of the vertical resolution of an originating bit map having FAX resolution (200 DPI) is controlled by multiplexer 93 and, in timing unit 82, by a module 3 counter 99 plus an AND gate 100.

Counter 99 is clocked by signal LSYNC and outputs a periodic signal NOT1 lasting two periods of signal LSYNC and having period three times the one of LSYNC.

Signal NOT1 is input to AND gate 100, receiving signal FAX at a second input.

When both FAX and NOT1 are asserted, gate 100 outputs a signal DS asserted, which controls multiplexer 93.

Multiplexer 93 has one input coupled to an output of buffer memory 81 corresponding to row 15 of the buffer 81 and when DS is asserted this input is coupled to input of cell 16 of register 84.

Therefore a DI bit stream of a FAX bit map (200 DPI) is first stored during a period of the LSYNC signal, in row 15 of memory buffer 81 (through MUX 93 and cell 16 of register 84), then in the subsequent period of signal LSYNC the same bit stream is rewritten in row 15 and copied in row 14, and in a further subsequent period of LSYNC is rewritten in row 15 and further copied in rows 14 and 13.

DS is input to an inverting input of gate 102 to prevent DREQ from reading input data DI from buffer 88 as long as DS is asserted.

Thus a FAX bit map having 200×200 DPI resolution is converted in a 600×600 DPI map stored in memory buffer 81.

Control circuits comprising an AND gate 103, an OR gate 104 a set/reset flip flop 105, a two stage counter CNT 107 and the already mentioned AND gate 90 shyncronize the operation of the timing unit 82, memory buffer 81 and register 84 to the operation of engine 86 as follows.

Address counter 83 is reset by a signal OVFL.

Address counter 83 is incremented by clock CKO.

When counter 83 reaches a predetermined count, corresponding to the scan line length, expressed in pixels number, with resolution of 600 DPI it generates the overflow signal OVFL causing incrementation of the stage counter 107, deassertion of a signal EN in output from counter 107 and reset of address counter 83.

OVFL is input to AND gate 103, receiving at a second input signal 300 DPI indicating that the original bit map resolution is 300 DPI.

The output of gate 103 is input to OR gate 104 whose output, asserted, sets flip flop 105.

The inverting output of flip flop 105 is coupled to an input of AND 90 which is therefore disabled to transfer further clock signals from oscillator 89 to the address counter 83.

With the next following LSYNC pulse flip flop 105 is reset and gate 90 is enabled.

If signal 300 DPI is deasserted (hence flip flop 105 is not set) the address counter 83, having been reset, continues to increment until a second assertion of OVFL signal reset it again and increments counter 107.

Counter 107, having reached a count of 2 outputs a set signal SET which, through OR 104 sets flip flop 105.

Again the address counter 83 is prevented from incrementing until the next occurring pulse LSYNC is received which resets both counter 107 and flip flop 105.

It is therefore clear that when the bit map resolution is 600×600 DPI or converted to such resolution from FAX resolution a second bit map row is loaded in buffer memory 81 during the time the energization beam is idle.

In summary a bit map input to memory buffer 81 is always stored therein with horizontal resolution of 600 DPI and the vertical resolution is 600 DPI in case the original bit map has vertical resolution of 600 DPI or has FAX resolution (200 DPI).

If the vertical resolution of the original bit map is 300 DPI the bit map is stored in buffer 81 with the same 300 DPI vertical resolution.

The timing unit 82 further comprises a multiplexer 108 an AND gate 199 and a delay element 109.

The multiplexer 108 receives at two data inputs, clock signal CKO through AND gate 199 and a clock signal having half the frequency of CKO from divider 97.

Multiplexer 108 is controlled by signal 300 DPI and outputs a clock signal CK3 having the frequency of CKO when 300 DPI is deasserted or half such frequency when 300 DPI is asserted.

CK3 suitably delayed by element 109 controls the bit pattern detecting and analysing unit 85, which receives through leads 110 a column of bits, in number of 17 (in the preferred embodiment) from register 84.

Therefore when signal 300 DPI is asserted, the columns of the 600 DPI bit map in output from register 84 are alternatively input to unit 85 or discarded and the horizontal resolution of 300 DPI of the original bit map is reestablished in input to unit 85.

Note also that AND gate 199 is controlled by signal EN in output from counter 107 and deasserted when counter 107 increments from zero count to one count.

Thus, when the memory buffer 81 is loading a bit map having vertical resolution of 600 DPI, in the idle or latency phase of the scanning beam period, no clock signal CK3 is input to unit 85.

Figure 17:
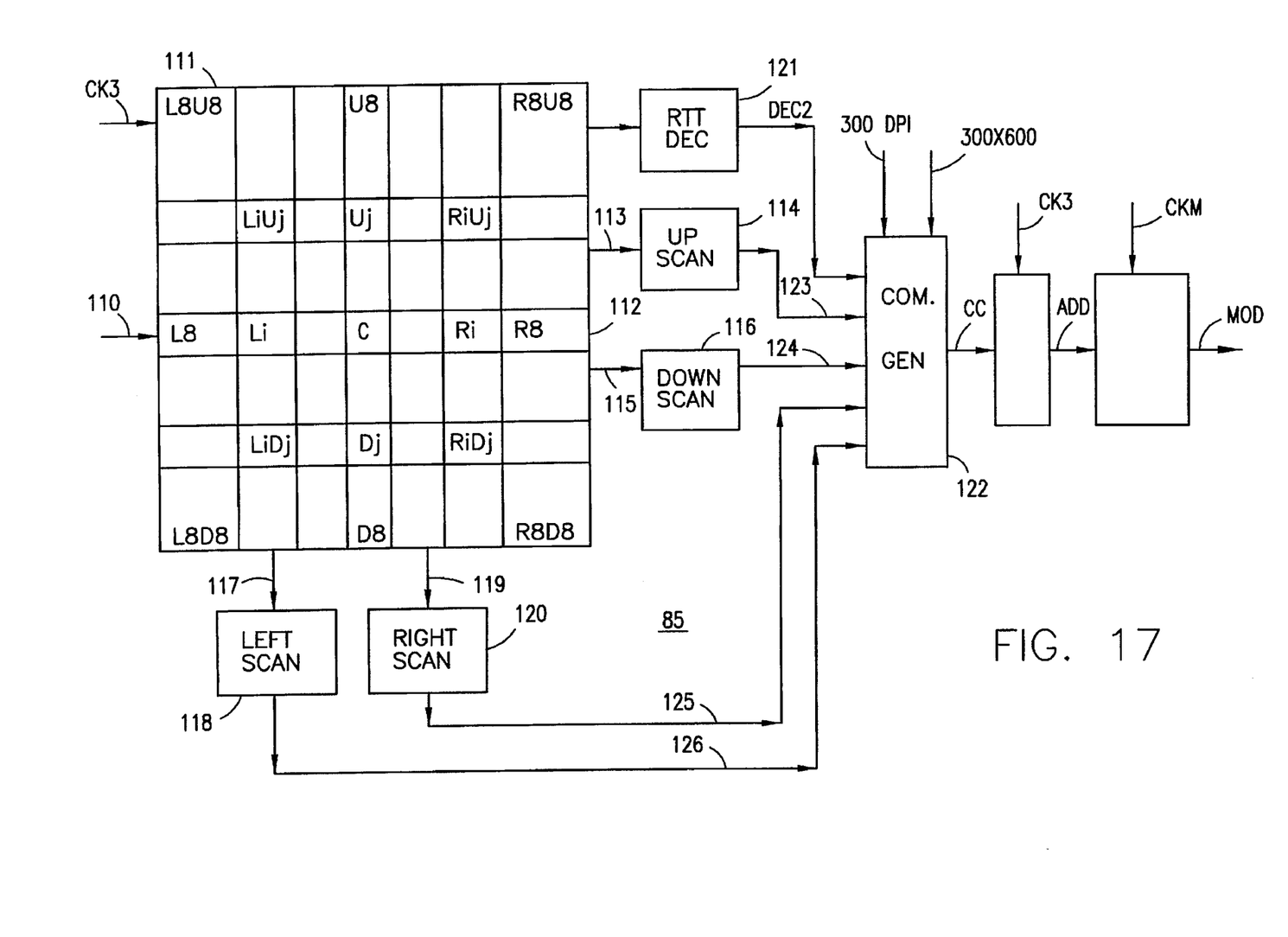
FIG. 17 is a block diagram of a preferred embodiment of a bit pattern analysing unit in the system of FIG. 16

FIG. 17 is a block diagram of unit 85.

Basically unit 85 comprises a plurality of shift registers in number of 17, each having a capacity of 17 bits, arranged to form a sample window 111 storing a portion of the bit map, as received, column by column from register 84 through an input 110.

The registers of the sample window 111 are clocked by signal CK3 and at each clock shift their contents one cell (to the right with reference to FIG.17).

The registers have parallel outputs, so that the state of each cell can be individually monitored.

Monitoring can be performed by comparison with templates as disclosed in already mentioned U.S. Pat. No. 4,847,641 or preferably with logical scans operations as will be discussed.

The sample windows 111 describes in binary representation an image portion in process of being printed or displayed. The pixel currently in process of being printed is described by a bit stored in the central cell 07 of a central register 112. For this reason this bit is commonly named central bit C.

Surrounding bits in the same row (register 112) R1 to R8 on the right, L1 to L8 on the left side, represent pixels of the image which have been just printed in sequence (R8 to R1) of will be printed in sequence immediately following bit C (L1 to L8).

Likewise upper bits $LiUj$, $Uj$, $RiUj$ (where j is row (or register) index and i a column index) represent pixels of the image which have been printed/displayed and lower bits $LiDj$, $Dj$, $RiDj$ represent pixels which will have to be printed/displayed.

Basically the operation performed by unit 85 is to detect bit C and establish, based on the bit pattern surrounding C if the pixel described by bit C has to be printed as a dot and which size must have the dot.

To this purpose bit C, bits $Li$ and $Ri$ of the same central register, and bits $Uj$ $LiUj$ and $RiUj$ of the upper two quadrants are input, through leads 113 to an upper scan unit 114 (a logic state machine UP SCAN).

Bit C, bits $Li,Ri$ of the same central register, and bits $Dj$, $LiDj$ and $RiDj$ of the lower two quadrants are input through leads 115, to a down scan unit 116 (a logic state machine DOWN SCAN).

Bit C, bits $Uj$ and $Lj$ of the same column and bits $LiUj$, $LiDj$ of the two left quadrants are input through leads 117, to a left scan unit 118 (a logic state machine LEFT SCAN).

Bit C, bits $Uj$ and $Dj$ of the same column and bits $RiUj$, $RiDj$ of the two right quadrants are input, through leads 119, to a right scan unit 120 (a logic state machine RIGHT SCAN).

The operation of the scan units 114, 116, 118, 120 in connection with sample window 111 is completely equivalent to the one described in EP-A0569657, the only difference being that the scan units 114, 116, 118, 120 receive all the required bits at the same time and the input bits are not multiplexed at subsequent times on the same inputs.

Thus the scan units perform a logical scan of the sample window in the sense that the result of a logical operation performed on a subset of the input bits is an input condition to a logical operation performed on another subset of the bits input to the scan unit.

Basically the operation performed by scan units 114, 116, 118, 120 is to detect edge or line discontinuities (jaggies) in the bit pattern surrounding bit C, in the respectively explored quadrants, and to output a code identifying the detected pattern defect.

The codes in output from scan units 114, 116, 118, 120, are input to a command generation unit 122, a further logical unit which merges the several information pieces received from the scan units and outputs a control code identifying the modification required in the displaying of the central bit C most suitable for minimizing or correcting the detected defect or defects.

As already indicated the modification may consist in dot modulation, e.g. displaying bit C as a dot whose size depends on the control code or in dot offsetting along the scan line, or both.

Before discussing further the operation of the scan units 114, 116, 118, 120 it is important to note that a further unit 121 (RTT DEC) is provided having the function of detecting bit patterns requiring adaptation as a function of the bit map resolution which differs from the scan line pitch of the used engine.

From the preceding description it results that when a bit map having 600 DPI, vertical resolution is read out column by column from register 84 and input to the scan window, there are rows (even rows) of the bit map which can be related to scan lines of the printing engine, and rows (odd rows) interleaved thereto which are not related to scan lines.

Moreover, while the contents of memory buffer 81 are vertically shifted during operation, one row at a time, the contents of sample window 111 are vertically shifted two rows at a time.

Clearly the central row, containing the central bit is a row related to a scan line, and the two adjacent rows are not related.

The function of unit 121 is therefore to detect the bit pattern surrounding the central bit C and to provide an indication on the way the central bit has to be printed keeping into account the state of the surrounding bit.

If adjacent to bit C there are, in an odd row, one or more bits representing dots to be displayed, they are merged in a single dot corresponding to bit C, but having a size such that the area of the printed/displayed dot is the sum of of the area of the pixels represented by bits which are merged in C.

In other words, if each bit represents a unitary area, when N bits are merged in a dot corresponding to bit C, the dot area is N times the unitary area.

Figures 18, 191, 192, 193, 194, 195, 196, 197, 198, 199, 1910, 1911, 1912, 1913, 1914:
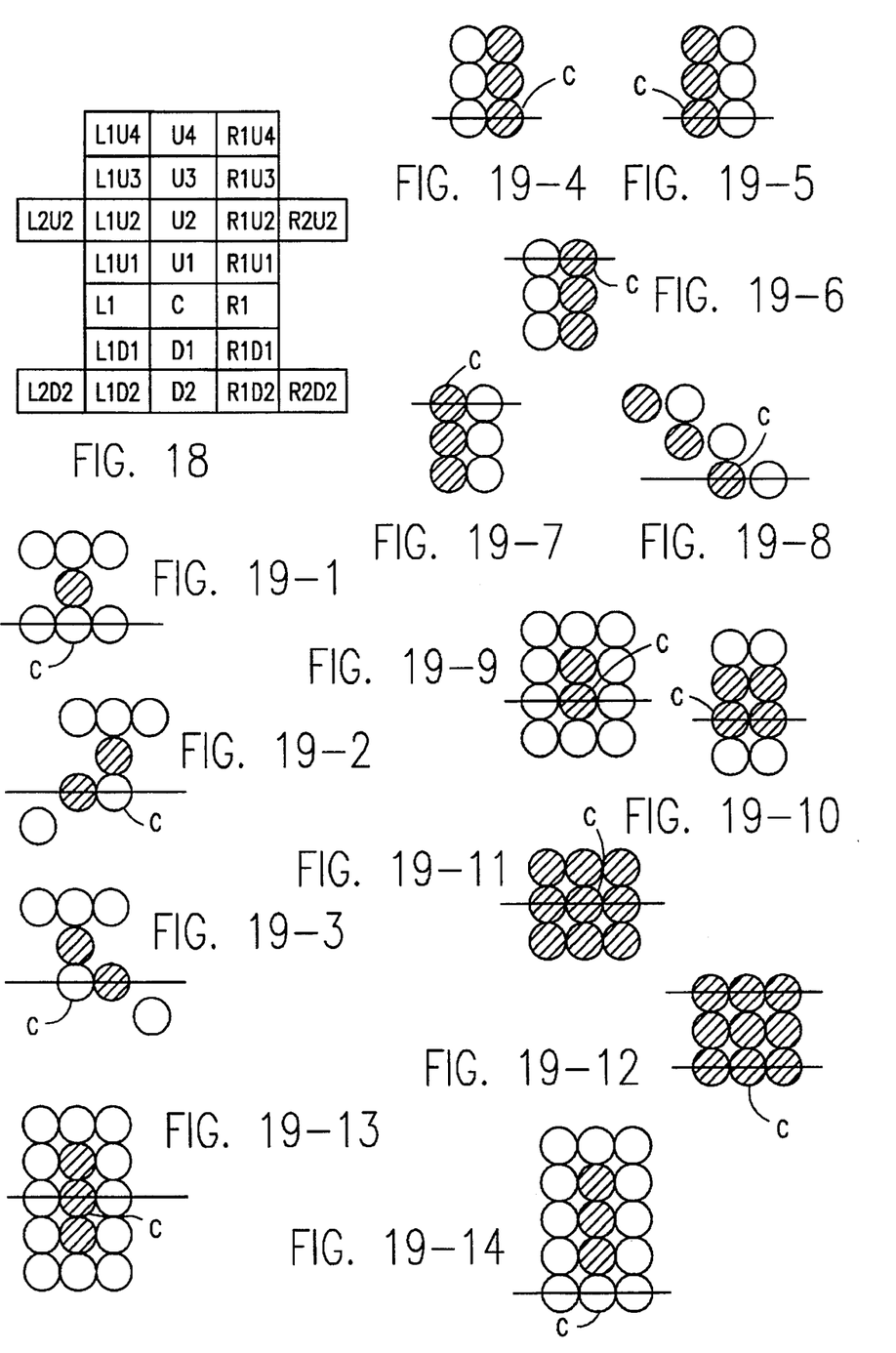

More specifically unit 121 has to detect within the bit map portion shown in FIG. 18 the following cases respectively shown in FIGS. 19-1 to 19-14 where solid dots indicate bits which must be 1, circles the bits which must be zero, the logic level of the bits not shown being unrelevant (do not care). Further central bit is referenced by C. 1) (FIG. 19-1) If bit U1=1 is a dot isolated upward, downward and diagonally. In this case U1 is an isolated dot or a dot of an horizontal line formed by adjacent dots. Since U1 is in an odd bit row unrelated to a scan line, it must be printed in shifted position as if it were in the central bit C position, and with the small size of a 600 DPI pixel. 2)3) (FIGS. 19-2, 3) If bit U1=1 represents a dot isolated upward,downward and in the upward diagonal direction but L1=1 while L2D1=0 or R1=1 and R2D1=0.

In this case bit U1 represents a dot of a diagonal two dots segment. Since U1 is in an odd bit row, unrelated to a scan line, it must be printed in shifted position as if it were in the central bit C position and with a small size of a 600 DPI pixel. 4) (FIG. 19-4) If bits U1=1, C=1 and U2=1 while L1=0, L1U1=0, L1U2=0, bit U1 represents a dot of a vertical line or edge.

In this case U1 must be printed as a dot split in two portions, one of which is shifted and merged with C, the other shifted and merged with U2 and printed when U2 becomes the current bit to be printed. In both cases C has to be printed as a dot having area 1, 5 times the one of a 600 DPI pixel. 5) (FIG. 19-5) Similar situation occurs if R1=0 and R1U1=0 and R1U2=0 instead of L1, L1U1, L1U2=0. 6)7) (FIGS. 19-6, 7) Similar situation occurs if C=1, D1=1, D2=1 and the leftward bits are 0 (FIG. 6) or the rightward bits are 0 (FIG. 7). 8) (FIG. 19-8) If bits C=1, L1U1=1 and L2U2=1 while R1=0, U1=0, L1=0, then L1U1 in an odd bit row represent a dot of a diagonal line or edge and similarly to the previous cases bit L1U1 must be printed as dot splitted in two parts, respectively merged in C and L1.

Accordingly C must be printed as a dot having an area 1, 5 times the area of a 600 DPI pixel.

The diagonal line or edge may be isolated leftward instead of rigtward and may be slanted in the opposite direction. Further it may extend downward instead of upward, relative to C.

All these cases are treated in the same way and do not need to be shown. 9) (FIG. 19-9) If bit C=1 and U1=1, while all adjacent bits are 0, then C represents a dot of a 2 dots vertical segment.

Since U1 is in an odd line it is merged in C which must be represented as a dot having an area 2 times the area of a 600 DPI pixel.

Similar situation, which is not shown, occurs if C=1 and D1=1, the adjacent bits being all 0. 10) (FIG. 19-10) If C=1, R1=1, U1=1, U1R1=1 while U2, U2R1, D1, D1R1=0 then C represents a dot of a double width horizontal line.

Since U1 and U1R1 are in an odd row, they are shifted and merged in C and R1. C is printed as a dot encompassing R1 and having an area 4 times the area of a 600 DPI pixel (as shown for instance in FIG. 3).

Clearly a dot cluster described by C=1, R1=1, D1=1, D1R1=1 while U1, U1R1, D2, D2R2=0 is treated in the same way. 11) (FIG. 19-11) If C=1 and all the surrounding bits are 1, then bit C represents a dot internal to an image or a dot of a triple width line.

Accordingly bit C is printed as a single dot having an area approximating 9 times the area of a 600 DPI pixel, thus representing the dot cluster with no shift and distorsion, as shown for instance in FIG.3. 12) (FIG. 19-12) If C=1, L1=1, R1=1, L1U1=1, U1=1, R1U1=1, L1U2=1, U2=1, R1U2=1 a situation similar to cases 6, 7 occurs and C is printed as a dot somehow larger than a 600 DPI pixel, to provide a displaying as shown for instance in FIG. 5.

Additional occurrencies may be considered as a further refinement in conformance to the basic criteria of shift and size modulation already described.

For example, FIG. 19-13 shows the case of a vertical segment formed by three dots, the centre dot being represented by bit C.

Rather than merging the three dots in C and representing the segment as a dot having area three times the one of a 600 DPI pixel, with a substantive distorsion of the image, it is preferable to display the segment with a vertical shift.

Accordingly bit C is printed as a dot with area 1,5 times the area of a 600 DPI pixel as a result of the partial merging of bit U1 in C.

Subsequently, as shown in FIG. 19-14, when the same pattern is again detected above the current bit C (in this case C=0), C is likewise printed as a dot having area 1,5 times the one of a 600 DPI pixel.

Diagonal segments of three bits may be treated in the same way.

Unit 121 may be structured as a comparator which compares the pattern described by sample window of FIG. 18 with a plurality of logic templates representing the several cases. It is however apparent that the number of cases to be considered is quite high.

In order to minimize the number of logic comparison operations it is preferable to perform a logical scan operation by first detecting the state of a small pattern involving few pixels, then broadening the inspection in a second stage, depending on the result of the first inspection and so on.

Given the set of patterns to be detected and the timing constraints imposed by the need to operate in real time synchronism with the printing/displaying equipment, the logic development tools available today enable to design the scanning logic 121 in form of a decoder or machine state which, depending on the detected pattern input thereto, outputs a code DEC2 representative of the detected pattern.

A similar scanning concept is preferably used by units 114, 116, 118, 120 as explained in EP-A-0569657.

Considering again FIG. 17 the output DEC2 from unit 121 is input to a command generation unit 122 which receives from scan units 114, 116, 118, 120 through leads 123, 124, 125, 126 binary codes similar to DEC2 indicative of bit patterns requiring the printing of bit C with some modification in size and timing in order to improve the image quality.

Unit 122 further receives control signal 300 DPI, 300×600 indicative of the resolution of the bit map portion stored in the sample window, so as to tailor such modifications and their timing to the resolution of the stored bit map.

Signals 300 DPI, 300×600 are provided to the printing/ displaying system by a data processing system coupled to the printing system, or by operator through suitable control switches.

Unit 122 based on the control signals and the codes input from units 121, 114, 116, 118, 120 converts the received binary codes in control codes CC indicative of the required dot size modulation and placement along the scan line.

The control codes CC in output from unit 122 are input to an address translation unit 127 clocked by signal CK3 which in turn outputs an address ADD referencing an entry in a look up modulation table 128.

Table 128 store a plurality of modulation patterns, one per entry.

The selected modulation pattern is read out from table 128, clocked by a timing signal CKM, having frequency much higher than CK (for instance ten times higher) as a bit stream MOD.

The bit stream MOD is passed to the printing engine or displaying unit 86 of FIG. 1, through the engine controller 87, and switches on-off the energization beam according to the pattern described by the MOD bit stream.

Figure 20:
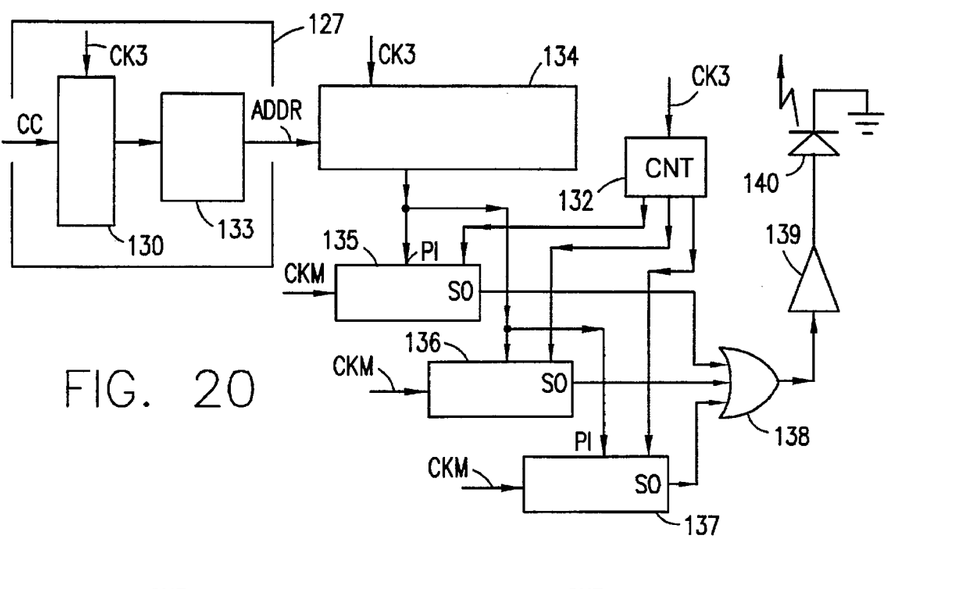
FIG. 20 shows in block diagram some components of the bit pattern analysing unit of FIG. 17 and their interaction with a displaying unit.

FIG. 20 shows more in detail the structure and operation of the address translation unit 127 and the lock up modulation table 128, in connection with the displaying unit 86.

It has to be reminded that in the resolution transforming process of the present invention bit clusters may lead to the displaying of enlarged dots, which to be formed may require an energization of the displaying unit scan beam for a time interval longer than the scan period PSP (pixel scan period) of a pixel at the resolution of 600 DPI in the scan line direction.

It has to be further reminded that, irrespective of size, graphic enhancement may require some shift of the displayed dot along the scan line, which requires the control modulation to be applied to the displaying unit in advance or with a delay as to the time for displayng the dot in the pixel nominal position.

The pixel nominal position and its period are defined by signal CK0, while signal CK3, which clocks the sample window 111 (FIG. 17), may have the scan period of CK0 or twice such period.

The address translation unit 127 comprises a latch register 130 and a memory 133 or equivalent logic circuit storing a translation table.

Register 130 is clocked by signal CK3 (suitably delayed if required) to latch the command code CC therein.

The command code CC latched in register 130 references an entry of memory 133 and the entry content is read out.

Although memory 133 could output a modulation code, it preferably outputs an address ADDR which is used to reference another memory 134 operating as a look up table clocked by signal CK3 and outputting a modulation code MOD.

In this way the memory 134 may store a plurality of modulation patterns sets, each set meeting the driving requirements of different displaying units. Each of the patterns is selected by a particular address code ADDR, output from memory 133.

By modifying the contents of the memory 133 it is possible to reference pattern sets in memory 134 best suitable to drive a particular kind of displaying unit, without need to modify the modulation patterns in memory 134.

The modulation pattern output from memory 134 is parallel input and stored in one of three shift registers 135, 136, 137, which are cyclically loaded at the occurrence of signal CK3.

Cyclical load enable may be provided in well known manner by a cyclical counter 132, triggered by signal CK3.

Shift registers 135, 136, 137 are controlled for serial read out by clock signal CKM.

It is to be noted that each modulation pattern read out from memory 134 and stored in one of shift register 135, 136, 137, encompasses more than one pixel scan period and in the preferred embodiment three pixel scan periods.

The serial outputs of the shift registers are ORed thrugh OR gate 138, whose output is coupled to the input of an amplifier 139 (in the displaying unit) which in turn drives the beam generator of the displaying unit, for instance a laser diode 140.

Figure 21:
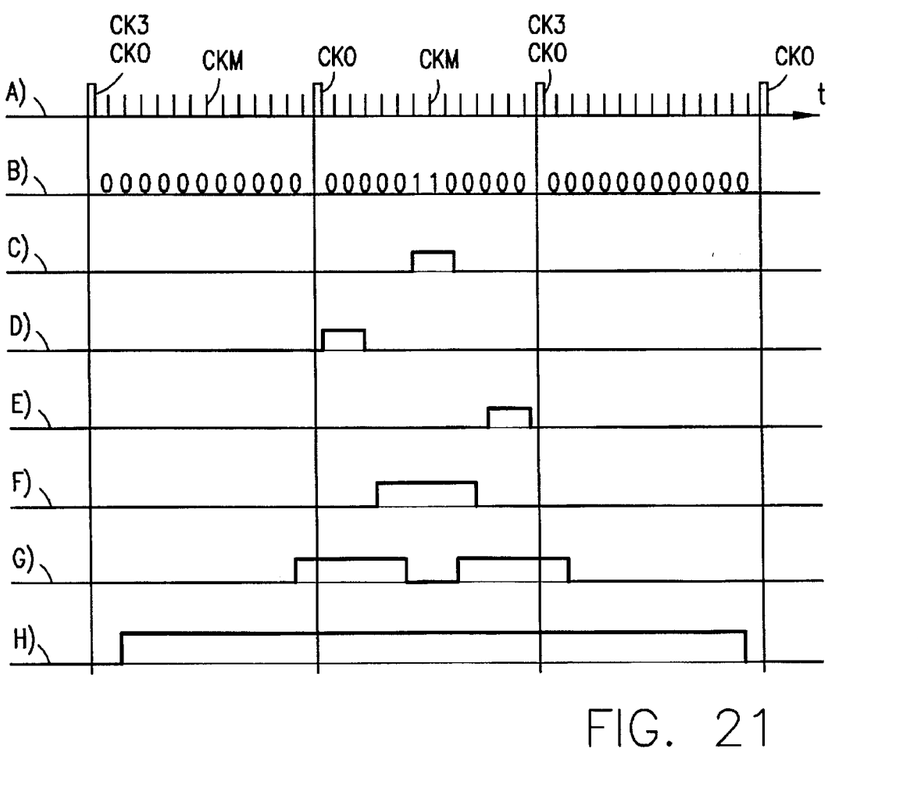
FIG. 21 shows in timing diagram some signals generated by the components of FIG. 20.

FIG. 21 shows in time diagram the timing pulses CK3, CK0, CKM (diagram A), the modulation code output from memory 134 for displaying a small dot having the size of a 600 DPI pixel in the pixel nominal position (diagram B) and the corresponding modulation signal driving the beam generator (diagram C).

It is clear that by a different arrangement of the "one" bits in the modulation code, the modulation signal may be generated in advance or with a delay, as shown by diagrams D and E respectively.

Diagram F, G, H are exemplary of other modulation signals driving the beam generator 140 to display a dot having area two times the one of a 600 DPI pixel, (diagram F), an area four times the one of a 600 DPI pixel, hence having a size equal to a 300 DPI pixel (diagram G) and a size 1,5 times the one of a 300 DPI pixel (diagram H).

The preceding description relates to a preferred embodiment and several changes can be made without departing from the scope of the invention.

For instance the control of the beam generator may be obtained by amplitude modulation, instead of width modulation.

The resolution of the original bit map is not necessarily twice the one of the displaying equipment, but can be any multiple (or a fraction which is converted in a multiple) and further the displaying equipment need not to be a laser printer or a CRT and can be a displaying unit using an array of visualization elements, a bidimensional image being obtained by relative movement (scan) of an image support relative to the array.

We claim:

1. Apparatus for reproducing a desired image with a raster based imaging device displaying image pixels arranged in scan lines having a predetermined pitch and related resolution by energization of a scanning beam having an energy spatial distribution with σ no greater than said pitch, comprising:

first means for temporary storing a bit map representing a portion at least of said desired image, said bit map comprising a plurality of M subsequent rows, each row comprising a number N of bits each representing a pixel of said desired image, the resolution of said rows being multiple of said scan line resolution, a number of said bits in said rows forming a sample window having a central bit in a central row and central column and adjacent bit, said central bit representing a pixel of said desired image to be displayed by said imaging device in one of said scan lines, pattern detection means coupled to said first means for detecting a first bit next adjacent to said central bit in a row next adjacent to said central row, having a logic level representing a dot to be displayed and a selected plurality of bits adjacent said first bit, including said central bit, each having a predetermined logic level, said pattern detecting means outputting a code related to the detected pattern and indicating that said central bit has to be displayed as a dot having an area sum of the areas of the dots represented by said first bit and said central bit at least, a translation table, coupled to said pattern detection means, for receiving said code and translating said code into a modulation pattern, and an imaging device coupled to said translation table for receiving said modulation pattern and imaging said central bit by energization, according to said received modulation pattern, of a scanning beam having an energy spatial distribution with sigma no greater than said pitch.

2. Apparatus as in claim 1, said pattern detection means, on detection of a cluster of bits including said central bit and all bits next adjacent to said central bit having said logic level representing a dot to be displayed, outputting a code indicating that said central bit has to be displayed as a dot having an area sum of the area of the pixels represented by said central bit and said next adjacent bits.

3. Apparatus as in claim 1), said pattern detection means detecting a column of bits at said logic level representing a dot to be displayed, said column comprising said central bit, said first bit and a third bit opposite to said central bit relative to said first bit and outputting a code indicating that said central bit has to be displayed as a dot having an area 1, 5 times said pixel.

4. Apparatus as in claim 1) comprising second means for converting a first image bit map having rows with resolution lower than said predetermined scan line resolution into a second bit map having rows with resolution multiple of said predetermined resolution, said second bit map being stored in said first means.

5. Apparatus as in claim 1) said translation table comprising a first translation unit and a second look up table, said first translation unit converting said code into an address referencing an entry of said look up table, said look up table outputting said modulation pattern.

6. Apparatus as in claim 5) comprising a plurality of shift registers coupled to said second look up table and cyclically parallel loaded with a modulation pattern output from said look up table, said shift registers serially outputting said modulation pattern to said imaging device.

7. Apparatus as in claim 2) comprising second means for converting a first image bit map having rows with resolution lower than said predetermined scan line resolution into a second bit map having rows with resolution multiple of said predetermined resolution, said second bit map being stored in said first means.

8. Apparatus as in claim 3) comprising second means for converting a first image bit map having rows with resolution lower than said predetermined scan line resolution into a second bit map having rows with resolution multiple of said predetermined resolution, said second bit map being stored in said first means.

9. Method for controlling raster based imaging device displaying pixels arranged along scan lines having a predetermined pitch and related line resolution with an image bit map having bits arranged in a plurality of rows having a row resolution multiple of said predetermined line resolution comprising the steps of:

temporary storing a portion at least of said bit map in register means, said bit map portion comprising a plurality of M subsequent rows of said bit map, each row comprising a number N of bits, each representing a pixel of said image, a number of said bits in said subsequent rows forming a sample window having a central bit in a central row and central column and adjacent bits, said central bit representing a pixel of said image to be displayed by said imaging device, detecting in said sample window a pattern comprising a first bit next adjacent to said central bit in a row next adjacent to said central row, having a logic level representing a dot to be displayed and a selected plurality of bits adjacent said first bit including said central bit, each having a predetermined logic level, generating a code related to said detected pattern and indicating that said central bit has to be displayed as a dot having an area sum of the areas of the dots represented by said first bit and said central bit at least, translating said code into a modulation pattern and modulating a scanning beam of said imaging device according to said modulation pattern, whereby a dot represented by said first bit is displayed as a dot shifted in the pixel related to said central bity and with a size dependent of said detected pattern so as to locally maintain in said displayed image the gray tone described by said bit map.

10. The method of claim 9) further comprising the steps of receiving an image bit map having resolution lower than said predetermined resolution and converting said lower resolution image bit map into an image bit map having bits arranged in a plurality of rows having row resolution multiple of said predetermined resolution.

* * * * *